(12) United States Patent
Asano et al.

(10) Patent No.: US 10,497,928 B2
(45) Date of Patent: Dec. 3, 2019

(54) POSITIVE-ELECTRODE ACTIVE MATERIAL AND BATTERY

(71) Applicant: Panasonic Intellectual Property Management Co., Ltd., Osaka (JP)

(72) Inventors: Kazuko Asano, Osaka (JP); Ryuichi Natsui, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/811,683

(22) Filed: Nov. 14, 2017

(65) Prior Publication Data

US 2018/0090745 A1 Mar. 29, 2018

Related U.S. Application Data

(63) Continuation of application No. PCT/JP2016/003949, filed on Aug. 30, 2016.

(30) Foreign Application Priority Data

Sep. 16, 2015 (JP) .................................. 2015-182648

(51) Int. Cl.
*H01M 4/485* (2010.01)
*H01M 4/1315* (2010.01)
(Continued)

(52) U.S. Cl.
CPC ........ *H01M 4/1315* (2013.01); *C01G 45/006* (2013.01); *C01G 51/006* (2013.01);
(Continued)

(58) Field of Classification Search
None
See application file for complete search history.

(56) References Cited

U.S. PATENT DOCUMENTS 8,741,484 B2 * 6/2014 Karthikeyan .......... C01G 51/50
429/223
2010/0086854 A1 * 4/2010 Kumar .................. H01M 4/505
429/223

(Continued)

FOREIGN PATENT DOCUMENTS

| EP | 2921455 | 9/2015 |
|----|---------|--------|
| JP | 1-209663 | 8/1989 |
| JP | 2015-128023 | 7/2015 |

OTHER PUBLICATIONS

International Search Report of PCT application No. PCT/JP2016/003949 dated Nov. 29, 2016.

*Primary Examiner* — Tracy M Dove
(74) *Attorney, Agent, or Firm* — McDermott Will & Emery LLP

(57) ABSTRACT

A positive-electrode active material contains a compound that has a crystal structure belonging to the space group FM3-M and that is represented by the composition formula (1):

$$Li_xMe_yO_\alpha F_\beta \qquad (1)$$

wherein Me denotes one or two or more elements selected from the group consisting of B, Ce, Si, Zr, Nb, Pr, Ti, W, Ge, Mo, Sn, and solid solutions thereof, and the following conditions are satisfied.

$1.8 \leq x \leq 2.2$ $0.8 \leq y \leq 1.3$ $1.2 \leq \alpha \leq 2.5$ $0.5 \leq \beta \leq 1.8$

7 Claims, 1 Drawing Sheet

(51) Int. Cl.
    *H01M 4/505*     (2010.01)
    *H01M 4/525*     (2010.01)
    *H01M 10/052*     (2010.01)
    *H01M 10/0525*     (2010.01)
    *C01G 45/00*     (2006.01)
    *C01G 51/00*     (2006.01)
    *C01G 53/00*     (2006.01)
    *H01M 4/02*     (2006.01)

(52) U.S. Cl.
    CPC .......... *C01G 53/006* (2013.01); *H01M 4/485* (2013.01); *H01M 4/505* (2013.01); *H01M 4/525* (2013.01); *H01M 10/052* (2013.01); *H01M 10/0525* (2013.01); *C01P 2002/72* (2013.01); *C01P 2002/76* (2013.01); *C01P 2006/40* (2013.01); *H01M 2004/028* (2013.01); *H01M 2220/30* (2013.01)

(56) References Cited

U.S. PATENT DOCUMENTS

2015/0010819 A1*   1/2015   Lee ................... H01M 4/525
                                                                   429/221
2017/0005332 A1    1/2017   Chen et al.

\* cited by examiner

POSITIVE-ELECTRODE ACTIVE MATERIAL AND BATTERY

BACKGROUND

1. Technical Field

The present disclosure relates to a positive-electrode active material for use in batteries and to a battery.

2. Description of the Related Art

Japanese Examined Patent Application Publication No. 7-107851 discloses a positive-electrode active material represented by $Li_2MnO_3$. In the positive-electrode active material, an oxidation reaction of oxygen occurs in the charging process. In the discharging process, discharging occurs by a reduction reaction of tetravalent Mn to trivalent Mn.

SUMMARY

In the related art, there is a demand for high-capacity batteries.

In one general aspect, the techniques disclosed here feature a positive-electrode active material according to one aspect of the present disclosure contains a compound that has a crystal structure belonging to the space group FM3-M and that is represented by the composition formula (1).

$$Li_xMe_yO_\alpha F_\beta \qquad (1)$$

wherein Me denotes one or two or more elements selected from the group consisting of B, Ce, Si, Zr, Nb, Pr, Ti, W, Ge, Mo, Sn, and solid solutions thereof.

Furthermore, the following conditions are satisfied.

$1.8 \le x \le 2.2$ $0.8 \le y \le 1.3$ $1.2 \le \alpha \le 2.5$ $0.5 \le \beta \le 1.8$ The present disclosure can provide a high-capacity battery.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
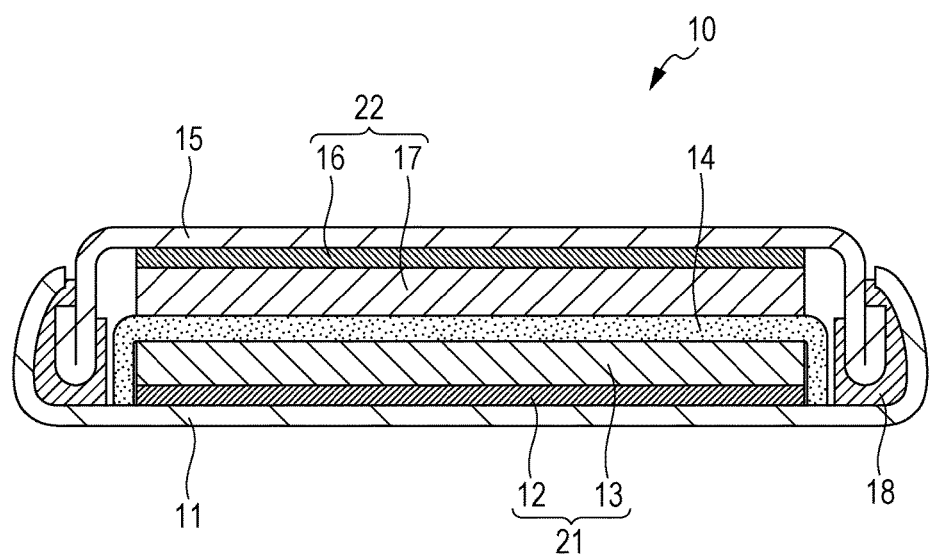
FIG. 1 is a schematic cross-sectional view of a battery of a second embodiment.

Embodiments of the present disclosure will be described below.

First Embodiment

A positive-electrode active material according to a first embodiment contains a compound that has a crystal structure belonging to the space group FM3-M and that is represented by the composition formula (1).

$$Li_xMe_yO_\alpha F_\beta \qquad (1)$$

wherein Me denotes at least one selected from the group consisting of B, Ce, Si, Zr, Nb, Pr, Ti, W, Ge, Mo, Sn, and solid solutions thereof (that is, one or two or more elements selected from the group).

In the positive-electrode active material of the first embodiment, the compound satisfies the following conditions in the composition formula (1).

$1.8 \le x \le 2.2$ $0.8 \le y \le 1.3$ $1.2 \le \alpha \le 2.5$ $0.5 \le \beta \le 1.8$ Such an embodiment can provide a high-capacity battery.

The present inventor presumes the reaction mechanism as described below.

In the positive-electrode material of the first embodiment, oxygen as well as Me undergoes an oxidation-reduction reaction in the charge/discharge process.

In a representative positive-electrode material $Li_2MnO_3$ in which oxygen is involved in the reaction, oxygen desorption in the charging process causes the structure to disintegrate.

Thus, it was assumed that the use of an element with high affinity to oxygen could suppress oxygen desorption in the charging process.

Examples of the element with high affinity to oxygen include elements with higher oxygen dissociation energy (Me—O) than Mn. In the order of affinity to oxygen, B, Ce, Si, Zr, Nb, Pr, Ti, W, Ge, Mo, and Sn can be selected.

This stabilizes the structure and improves discharge capacity.

In the composition formula (1), x of less than 1.8 indicates that the amount of available Li in the compound decreases. This results in insufficient capacity.

In the composition formula (1), x of more than 2.2 indicates that the proportion of transition metal to be introduced into the compound decreases. This results in insufficient capacity.

In the composition formula (1), y of less than 0.8 indicates that the amount of transition metal in the compound that can be utilized in an oxidation-reduction reaction decreases. This results in insufficient capacity.

In the composition formula (1), y of more than 1.3 indicates that the compound cannot have a single crystal structure and contains impurities. This results in insufficient capacity.

In the composition formula (1), α of less than 1.2 indicates that the effects of highly electronegative F on the compound increase. This results in electron localization and low electron conductivity, thus resulting in insufficient capacity.

In the composition formula (1), α of more than 2.5 indicates that the effects of highly electronegative F on the compound decrease. This decreases cation-anion interaction. This destabilizes the structure when Li is desorbed and therefore results in insufficient capacity.

In the composition formula (1), β of less than 0.5 indicates a decreased effect of fluorination on the compound and a decreased average voltage. Thus, the discharge cut-off voltage is quickly reached, which results in insufficient capacity.

In the composition formula (1), $\beta$ of more than 1.8 indicates that fluorine in the structure increases and the effects of highly electronegative F on the compound decrease. This decreases cation-anion interaction. This destabilizes the structure when Li is desorbed and therefore results in insufficient capacity.

The use of Me tends to decrease the operating voltage potential. The introduction of highly electronegative F can improve the average voltage compared with oxides.

In the positive-electrode active material of the first embodiment, a compound represented by the composition formula (1) has a crystal structure belonging to the space group FM3-M (rock-salt-type crystal structure).

Upon abstraction of much Li, a layered structure specified by the space group R3-M cannot hold the layers and disintegrates.

By contrast, a rock-salt-type crystal structure specified by the space group FM3-M, such as a compound according to the present disclosure, has no Li layer, unlike the layered structure, and can stably maintain the structure without disintegration, even after abstraction of much Li. Thus, a high-capacity battery can be provided.

For example, a lithium-ion battery containing a positive-electrode active material containing the compound has an oxidation-reduction potential (vs. Li/Li$^+$) of approximately 3.3 V and a capacity of approximately 240 mAh/g or more.

In the composition formula (1), the ratio of Li to Me is represented by $\{Li_x/Me_y\}$, In the ratio, $1.8 \leq x \leq 2.2$ and $0.8 \leq y \leq 1.3$.

Thus, the ratio of Li to Me is theoretically in the range of $1.38 \leq \{Li_x/Me_y\} \leq 2.75$ and is more than 1.

The number of Li atoms per Me atom is larger than that for a known positive-electrode active material, for example, LiMnO$_2$.

In a compound represented by the composition formula (1), Li and Me are probably located at the same site.

Thus, a compound represented by the composition formula (1) can intercalate and deintercalate more Li per Me atom than a known positive-electrode active material, for example, LiMnO$_2$.

Thus, the positive-electrode active material of the first embodiment is suitable for high-capacity lithium-ion batteries.

The positive-electrode active material of the first embodiment may contain the compound as a main component.

Such an embodiment can provide a higher-capacity battery.

The term "main component", as used herein, means that the compound constitutes, for example, 90% or more by weight of the positive-electrode active material of the first embodiment.

In addition to the compound as a main component, the positive-electrode active material of the first embodiment may contain incidental impurities, or starting materials for the synthesis of the compound, by-products, and degradation products.

In the positive-electrode active material of the first embodiment, the compound may satisfy $x+y=\alpha+\beta=3$ in the composition formula (1).

Such an embodiment can provide a higher-capacity battery.

The phrase "Me denotes at least one selected from the group consisting of B, Ce, Si, Zr, Nb, Pr, Ti, W, Ge, Mo, Sn, and solid solutions thereof" in the first embodiment means the following.

In the positive-electrode active material of the first embodiment, Me may denote one element selected from B, Ce, Si, Zr, Nb, Pr, Ti, W, Ge, Mo, and Sn.

Alternatively, in the positive-electrode active material of the first embodiment, Me may denote a solid solution composed of two or more elements selected from B, Ce, Si, Zr, Nb, Pr, Ti, W, Ge, Mo, and Sn.

Alternatively, in the positive-electrode active material of the first embodiment, Me may denote a solid solution of one or more elements selected from B, Ce, Si, Zr, Nb, Pr, Ti, W, Ge, Mo, and Sn and another element (for example, Ni, Mn, Co, Fe, etc.).

In the positive-electrode active material of the first embodiment, Me may denote a solid solution composed of Co and Mo, a solid solution composed of Ni and Mo, a solid solution composed of Mn and Mo, a solid solution composed of Co and Nb, a solid solution composed of Ni and Nb, or a solid solution composed of Mn and Nb.

Such an embodiment can provide a higher-capacity battery.

In the positive-electrode active material of the first embodiment, a compound represented by the composition formula (1) may be $Li_2Co_{0.8}Mo_{0.2}O_2F$, $Li_2Ni_{0.8}Mo_{0.2}O_2F$, $Li_2Mn_{0.8}Mo_{0.2}O_2F$, $Li_2Co_{0.8}Nb_{0.2}O_2F$, $Li_2Ni_{0.8}Nb_{0.2}O_2F$, or $Li_2Mn_{0.8}Nb_{0.2}O_2F$.

Such an embodiment can provide a higher-capacity battery.

<Method for Producing Compound>

An exemplary method for producing the compound of the positive-electrode active material of the first embodiment will be described below.

A compound represented by the composition formula (1) can be produced by the method described below, for example.

A raw material containing Li, a raw material containing F, and a raw material containing Me are prepared. Examples of the raw material containing Li include oxides, such as Li$_2$O and Li$_2$O$_2$, salts, such as LiF, Li$_2$CO$_3$, and LiOH, and lithium composite transition metal oxides, such as LiMeO$_2$ and LiMe$_2$O$_4$. Examples of the raw material containing F include LiF and transition metal fluorides. Examples of the raw material containing Me include oxides with various oxidation states, such as Me$_2$O$_3$, salts, such as MeCO$_3$ and MeNO$_3$, hydroxides, such as Me(OH)$_2$ and MeOOH, and lithium composite transition metal oxides, such as LiMeO$_2$ and LiMe$_2$O$_4$. In the case that Me is Mo, examples of the raw material containing Mo include molybdenum oxides with various oxidation states, such as MoO$_2$, and lithium composite transition metal oxides, such as LiMoO$_2$ and Li$_2$MoO$_3$.

These raw materials are weighed at the mole ratio of the composition formula (1).

The variables "x, y, $\alpha$, and $\beta$" in the composition formula (1) can be altered in the ranges described for the composition formula (1).

The weighed raw materials are mixed, for example, by a dry process or a wet process and are allowed to react mechanochemically for 10 hours or more to produce a compound represented by the composition formula (1). For example, a mixing apparatus, such as a ball mill, may be used.

The raw materials and the conditions for mixing a mixture of the raw materials can be adjusted to produce a compound substantially represented by the composition formula (1).

The use of a lithium transition metal composite oxide as a precursor can decrease the energy for mixing elements.

Thus, a compound represented by the composition formula (1) can be produced with higher purity.

The composition of a compound represented by the composition formula (1) thus produced can be determined by ICP spectroscopy and an inert gas fusion-infrared absorption method, for example.

A compound represented by the composition formula (1) can be identified by determining the space group of the crystal structure by powder X-ray analysis.

Thus, a method for producing a positive-electrode active material according to one aspect of the first embodiment includes (a) a step of preparing the raw materials and (b) a step of mechanochemically reacting the raw materials to produce the positive-electrode active material.

The step (a) may include a step of mixing a raw material containing Li and F and a raw material containing Me at a Li/Me mole ratio in the range of 1.38 to 2.5 to prepare a raw material mixture.

The step (a) may include a step of producing a raw material, a lithium transition metal composite oxide, by a known method.

The step (a) may include a step of mixing the raw materials at a Li/Me mole ratio in the range of 1.7 to 2.0 to prepare a raw material mixture.

The step (b) may include a step of mechanochemically reacting the raw materials in a ball mill.

Thus, a compound represented by the composition formula (1) may be synthesized by mechanochemically reacting a precursor (for example, LiF, $Li_2O$, a transition metal oxide, a lithium composite transition metal, etc.) in a planetary ball mill.

The mixing ratio of the precursor can be adjusted to introduce more Li atoms.

When the precursor is reacted by a solid phase method, the precursor is decomposed into more stable compounds.

Thus, a compound that has a crystal structure belonging to the space group FM3-M and is represented by the composition formula (1) cannot be produced by a method for reacting the precursor by a solid phase method.

Second Embodiment

A second embodiment will be described below. The contents described in the first embodiment are appropriately omitted to avoid overlap.

A battery of the second embodiment includes a positive electrode containing the positive-electrode active material of the first embodiment, a negative electrode, and an electrolyte.

Such an embodiment can provide a high-capacity battery.

More specifically, as described in the first embodiment, the positive-electrode active material contains many Li atoms per Me atom. Thus, a high-capacity battery can be provided.

The battery of the second embodiment may be a lithium-ion secondary battery or a non-aqueous electrolyte secondary battery, for example.

In the battery of the second embodiment, for example, the negative electrode may contain a negative-electrode active material that can adsorb and desorb lithium (that has lithium adsorption and desorption characteristics) or lithium metal.

In the battery of the second embodiment, for example, the electrolyte may be a non-aqueous electrolyte (for example, a non-aqueous electrolyte solution).

FIG. 1 is a schematic cross-sectional view of a battery 10 of the second embodiment.

As illustrated in FIG. 1, the battery 10 includes a positive electrode 21, a negative electrode 22, a separator 14, a case 11, a sealing plate 15, and a gasket 18.

The separator 14 is disposed between the positive electrode 21 and the negative electrode 22.

The positive electrode 21, the negative electrode 22, and the separator 14 are impregnated with a non-aqueous electrolyte (for example, a non-aqueous electrolyte solution).

The positive electrode 21, the negative electrode 22, and the separator 14 constitute an electrode group.

The electrode group is housed in the case 11.

The case 11 is sealed with the gasket 18 and the sealing plate 15.

The positive electrode 21 includes a positive-electrode current collector 12 and a positive-electrode active material layer 13 disposed on the positive-electrode current collector 12.

The positive-electrode current collector 12 is formed of a metallic material (aluminum, stainless steel, aluminum alloy, etc.), for example.

The positive-electrode current collector 12 may be omitted, and the case 11 may be used as a positive-electrode current collector.

The positive-electrode active material layer 13 contains the positive-electrode active material of the first embodiment.

If necessary, the positive-electrode active material layer 13 may contain an additive agent (electrically conductive agent, ionic conduction aid, binder, etc.).

The negative electrode 22 includes a negative-electrode current collector 16 and a negative-electrode active material layer 17 disposed on the negative-electrode current collector 16.

The negative-electrode current collector 16 is formed of a metallic material (copper, nickel, aluminum, stainless steel, aluminum alloy, etc.), for example.

The negative-electrode current collector 16 may be omitted, and the sealing plate 15 may be used as a negative-electrode current collector.

The negative-electrode active material layer 17 contains a negative-electrode active material.

If necessary, the negative-electrode active material layer 17 may contain an additive agent (electrically conductive agent, ionic conduction aid, binder, etc.).

The negative-electrode active material may be a metallic material, carbon material, oxide, nitride, tin compound, or silicon compound.

The metallic material may be a single metal or an alloy. Examples of the metallic material include lithium metals and lithium alloys.

Examples of the carbon material include natural graphite, coke, carbon under graphitization, carbon fiber, spherical carbon, artificial graphite, and amorphous carbon.

From the perspective of capacity density, silicon (Si), tin (Sn), silicon compounds, and tin compounds can be suitably used. Silicon compounds and tin compounds may be alloys and solid solutions.

Examples of the silicon compounds include $SiO_x$ (wherein $0.05<x<1.95$). Compounds (alloys and solid solutions) produced by substituting another element for part of silicon of $SiO_x$ may also be used. The other element may be at least one selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include $Ni_2Sn_4$, $Mg_2Sn$, $SnO_x$ (wherein $0<x<2$), $SnO_2$, and $SnSiO_3$. One tin compound selected from these compounds may be used alone. Alternatively, two or more tin compounds selected from these compounds may be used in combination.

The negative-electrode active material may have any shape. The negative-electrode active material may have a known shape (particulate, fibrous, etc.).

The negative-electrode active material layer 17 may be filled with (adsorb) lithium by any method. More specifically, the method may be (a) a method for depositing lithium on the negative-electrode active material layer 17 by a gas phase method, such as a vacuum evaporation method, or (b) a method for heating a lithium metal foil in contact with the negative-electrode active material layer 17. In these methods, lithium can be diffused into the negative-electrode active material layer 17 by heat. Alternatively, lithium may be electrochemically adsorbed on the negative-electrode active material layer 17. More specifically, a battery is assembled from the negative electrode 22 free of lithium and a lithium metal foil (positive electrode). Subsequently, the battery is charged to adsorb lithium on the negative electrode 22.

Examples of the binder for the positive electrode 21 and the negative electrode 22 include poly(vinylidene difluoride), polytetrafluoroethylene, polyethylene, polypropylene, aramid resin, polyimide, polyimide, polyamideimide, polyacrylonitrile, poly(acrylic acid), poly(methyl acrylate), poly(ethyl acrylate), poly(hexyl acrylate), poly(methacrylic acid), poly(methyl methacrylate), poly(ethyl methacrylate), poly(hexyl methacrylate), poly(vinyl acetate), polyvinylpyrrolidone, polyether, polyethersulfone, hexafluoropolypropylene, styrene-butadiene rubber, and carboxymethylcellulose. Other examples of the binder include copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. The binder may also be a mixture of two or more materials selected from these materials.

Examples of the electrically conductive agent for the positive electrode 21 and the negative electrode 22 include graphite, carbon black, electrically conductive fiber, graphite fluoride, metal powders, electrically conductive whiskers, electrically conductive metal oxides, and electrically conductive organic materials. Examples of the graphite include natural graphite and artificial graphite. Examples of the carbon black include acetylene black, ketjen black (registered trademark), channel black, furnace black, lampblack, and thermal black. Examples of the metal powders include aluminum powders. Examples of the electrically conductive whiskers include zinc oxide whiskers and potassium titanate whiskers. Examples of the electrically conductive metal oxides include titanium oxide. Examples of the electrically conductive organic materials include phenylene derivatives.

The separator 14 may be formed of a material that has high ion permeability and sufficient mechanical strength. Examples of such a material include microporous thin films, woven fabrics, and nonwoven fabrics. More specifically, it is desirable that the separator 14 be formed of a polyolefin, such as polypropylene or polyethylene. The separator 14 formed of a polyolefin has not only good durability but also a shutdown function in case of excessive heating. The separator 14 has a thickness in the range of 10 to 300 µm (or 10 to 40 µm), for example. The separator 14 may be a monolayer film formed of one material. Alternatively, the separator 14 may be a composite film (or multilayer film) formed of two or more materials. The separator 14 has a porosity in the range of 30% to 70% (or 35% to 60%), for example. The term "porosity", as used herein, refers to the volume ratio of pores to the separator 14. The "porosity" is measured by a mercury intrusion method, for example.

The non-aqueous electrolyte solution contains a non-aqueous solvent and a lithium salt dissolved in the non-aqueous solvent.

Examples of the non-aqueous solvent include cyclic carbonate solvents, chain carbonate solvents, cyclic ether solvents, chain ether solvents, cyclic ester solvents, chain ester solvents, and fluorinated solvents.

Examples of the cyclic carbonate solvents include ethylene carbonate, propylene carbonate, and butylene carbonate.

Examples of the chain carbonate solvents include dimethyl carbonate, ethyl methyl carbonate, and diethyl carbonate.

Examples of the cyclic ether solvents include tetrahydrofuran, 1,4-dioxane, and 1,3-dioxolane.

Examples of the chain ether solvents include 1,2-dimethoxyethane and 1,2-diethoxyethane.

Examples of the cyclic ester solvent include γ-butyrolactone.

Examples of the chain ester solvents include methyl acetate.

Examples of the fluorinated solvents include fluoroethylene carbonate, methyl fluoropropionate, fluorobenzene, fluoroethyl methyl carbonate, and fluorodimethylene carbonate.

The non-aqueous solvent may be one non-aqueous solvent selected from these. Alternatively, the non-aqueous solvent may be a combination of two or more non-aqueous solvents selected from these.

The non-aqueous electrolyte solution may contain at least one fluorinated solvent selected from the group consisting of fluoroethylene carbonate, methyl fluoropropionate, fluorobenzene, fluoroethyl methyl carbonate, and fluorodimethylene carbonate.

These fluorinated solvents in the non-aqueous electrolyte solution improve the oxidation resistance of the non-aqueous electrolyte solution.

Consequently, even when the battery 10 is charged at a high voltage, the battery 10 can operate stably.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. The lithium salt may be one lithium salt selected from these. Alternatively, the lithium salt may be a mixture of two or more lithium salts selected from these. The concentration of the lithium salt ranges from 0.5 to 2 mol/liter, for example.

The battery of the second embodiment may be of various types, such as coin type, cylindrical type, square or rectangular type, sheet type, button type, flat type, or layered type.

EXAMPLES

Example 1

[Production of Positive-Electrode Active Material]

LiF, $LiCoO_2$, and $LiMoO_2$ were weighed at a mole ratio of $LiF/LiCoO_2/LiMoO_2$=1.0/0.8/0.2.

The raw materials, together with a proper amount of φ3-mm zirconia balls, were put in a 45-cc zirconia container, which was then sealed in an argon glove box.

It was removed from the argon glove box and was treated in a planetary ball mill at 600 rpm for 30 hours.

The resulting compound was subjected to X-ray powder diffraction measurement.

Figure 2:
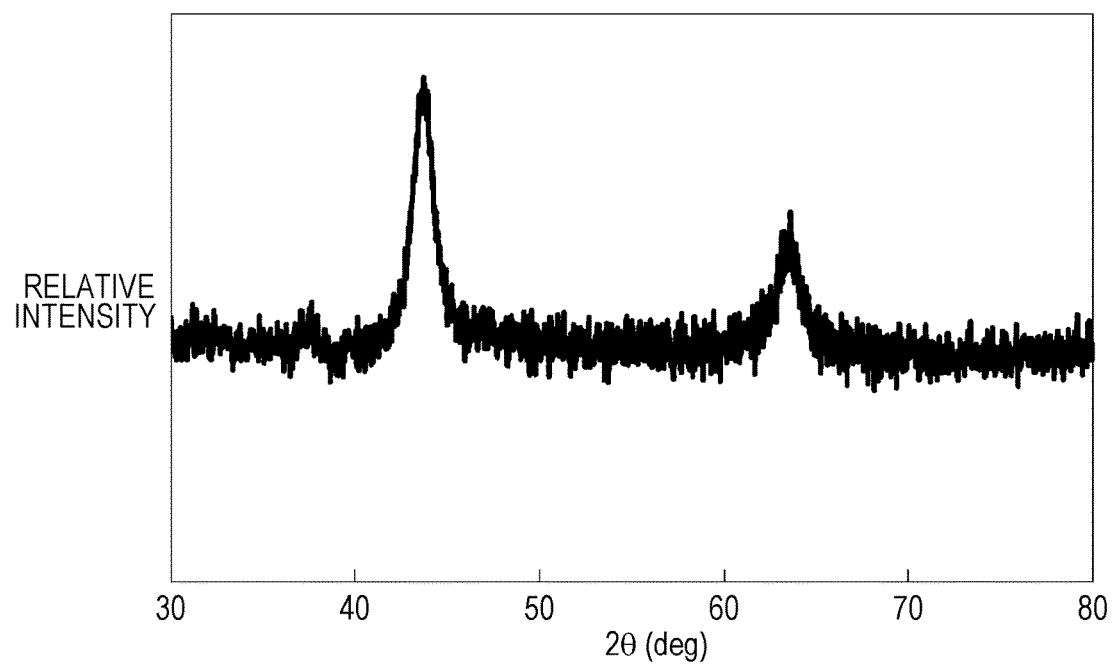
FIG. 2 is an X-ray powder diffraction chart of a positive-electrode active material of Example 1.

FIG. 2 shows the results.

The space group of the compound was FM3-M.

The composition of the compound was $Li_2Co_{0.8}Mo_{0.2}O_2F$.

[Production of Battery]

70 parts by mass of the compound, 20 parts by mass of an electrically conductive agent, 10 parts by mass of poly (vinylidene difluoride) (PVDF), and a proper amount of 2-methylpyrrolidone (NMP) were mixed to prepare a positive-electrode mixture slurry.

The positive-electrode mixture slurry was applied to one side of a positive-electrode current collector formed of aluminum foil 20 μm in thickness.

The positive-electrode mixture slurry was dried and rolled to form a positive-electrode plate with a positive-electrode active material layer. The positive-electrode plate had a thickness of 60 μm.

A circular positive electrode 12.5 mm in diameter was punched out from the positive-electrode plate.

A circular negative electrode 14.0 mm in diameter was punched out from lithium metal foil 300 μm in thickness.

Fluoroethylene carbonate (FEC), ethylene carbonate (EC), and ethyl methyl carbonate (EMC) were mixed at a volume ratio of 1:1:6 to prepare a non-aqueous solvent.

$LiPF_6$ was dissolved at a concentration of 1.0 mol/liter in the non-aqueous solvent to prepare a non-aqueous electrolyte solution.

A separator (manufactured by Celgard, LLC., product number 2320, 25 μm in thickness) was impregnated with the non-aqueous electrolyte solution.

Celgard (registered trademark) 2320 is a 3-layer separator composed of a polypropylene layer, a polyethylene layer, and a polypropylene layer.

A CR2032 coin-type battery was assembled from the positive electrode, the negative electrode, and the separator in a dry box maintained at a dew point of −50° C.

Examples 2 to 6

Me was changed from Example 1.

Table lists the precursors for the production of positive-electrode active materials of Examples 1 to 6 and the component ratios of the positive-electrode active materials thus synthesized.

Except for these, the positive-electrode active materials of Examples 2 to 6 were synthesized in the same manner as in Example 1. The precursors of Examples 2 to 6 were weighed at the stoichiometric ratio and were mixed in the same manner as in Example 1.

Coin-type batteries were produced from the positive-electrode active materials of Examples 2 to 6 in the same manner as in Example 1.

Comparative Example 1

$LiCO_3$ and $MnCO_3$ were weighed at a mole ratio of $LiCO_3/MnCO_3=1.05/1.0$.

The raw material mixture was fired in the air at 700° C. for 12 hours.

Thus, $Li_2MnO_3$ particles were formed as a positive-electrode active material.

The space group of the $Li_2MnO_3$ was C2/m.

A coin-type battery was produced in the same manner as in Example 1 by using the $Li_2MnO_3$ particles as a positive-electrode active material.

<Evaluation of Battery>

The electric current density on the positive electrode was set at 0.005 mA/cm$^2$, and the battery of Example 1 was charged to a voltage of 5.2 V.

Subsequently, the discharge cut-off voltage was set at 1.5 V, and the battery of Example 1 was discharged at an electric current density of 0.05 mA/cm$^2$.

The initial discharge capacity was 280 mAh/g.

The electric current density on the positive electrode was set at 0.05 mA/cm$^2$, and the battery of Comparative Example 1 was charged to a voltage of 5.2 V.

Subsequently, the discharge cut-off voltage was set at 1.5 V, and the battery of Comparative Example 1 was discharged at an electric current density of 0.005 mA/cm$^2$.

The initial discharge capacity of the battery of Comparative Example 1 was 208 mAh/g.

The capacities of the coin-type batteries of Examples 2 to 6 were measured in the same manner as in Example 1.

Table shows the results.

TABLE

| Sample | Precursor | Composition | Space group | Initial discharge capacity mAh/g |
|---|---|---|---|---|
| Example 1 | LiF—LiCoO$_2$—LiMoO$_2$ | Li$_2$Co$_{0.8}$Mo$_{0.2}$O$_2$F | FM3-M | 280 |
| Example 2 | LiF—LiNiO$_2$—LiMoO$_2$ | Li$_2$Ni$_{0.8}$Mo$_{0.2}$O$_2$F | FM3-M | 242 |
| Example 3 | Li$_2$O—LiF—LiMoO$_2$—Mn$_2$O$_3$ | Li$_2$Mn$_{0.8}$Mo$_{0.2}$O$_2$F | FM3-M | 250 |
| Example 4 | LiF—LiCoO$_2$—LiNbO$_2$ | Li$_2$Co$_{0.8}$Nb$_{0.2}$O$_2$F | FM3-M | 270 |
| Example 5 | LiF—LiNiO$_2$—LiNbO$_2$ | Li$_2$Ni$_{0.8}$Nb$_{0.2}$O$_2$F | FM3-M | 232 |
| Example 6 | Li$_2$O—LiF—LiNbO$_2$—Mn$_2$O$_3$ | Li$_2$Mn$_{0.8}$Nb$_{0.2}$O$_2$F | FM3-M | 252 |
| Comparative example 1 | LiCO$_3$—MnCO$_3$ | Li$_2$MnO$_3$ | C2/m | 208 |

Table shows that the initial discharge capacity of the batteries of Examples 1 to 6 ranged from 242 to 280 mAh/g.

The initial discharge capacities of the batteries of Examples 1 to 6 were larger than that of Comparative Example 1.

A positive-electrode active material according to the present disclosure can be suitable for a positive-electrode active material of batteries, such as secondary batteries.

What is claimed is:

1. A positive-electrode active material comprising a compound that has a crystal structure belonging to a space group FM3-M and is represented by the composition formula (1):

$$Li_xMe_yO_\alpha F_\beta \qquad (1)$$

wherein Me denotes a solid solution composed of Co and Mo, a solid solution composed of Ni and Mo, a solid solution composed of Mn and Mo, a solid solution composed of Co and Nb, a solid solution composed of Ni and Nb, or a solid solution composed of Mn and Nb, and the following conditions are satisfied $1.8 \leq x \leq 2.2$ $0.8 \leq y \leq 1.3$ $1.2 \leq \alpha \leq 2.5$ $0.5 \leq \beta \leq 1.8$.

2. The positive-electrode active material according to claim 1, containing the compound as a main component.

3. The positive-electrode active material according to claim 1, satisfying $x+y=\alpha-\beta=3$.

4. A positive-electrode active material comprising a compound that has a crystal structure belonging to a space group FM3-M and the compound is $Li_2Co_{0.8}Mo_{0.2}O_2F$, $Li_2Mn_{0.8}Mo_{0.2}O_2F$, $Li_2Mn_{0.8}Mo_{0.2}O_2F$, $Li_2Co_{0.8}Nb_{0.2}O_2F$, $Li_2Ni_{0.8}Nb_{0.2}O_2F$, or $Li_2Mn_{0.8}Nb_{0.2}O_2F$.

5. A battery comprising:
a positive electrode containing the positive-electrode active material according to claim 1;
a negative electrode; and
an electrolyte.

6. The battery according to claim 5, wherein
the negative electrode contains a negative-electrode active material with lithium adsorption and desorption characteristics, and
the electrolyte is a non-aqueous electrolyte solution.

7. The battery according to claim 5, wherein the compound is $Li_2Co_{0.8}Mo_{0.2}O_2F$, $Li_2Ni_{0.8}Mo_{0.2}O_2F$, $Li_2Mn_{0.8}Mo_{0.2}O_2F$, $Li_2Co_{0.8}Nb_{0.2}O_2F$, $Li_2Ni_{0.8}Nb_{0.2}O_2F$, or $Li_2Mn_{0.8}Nb_{0.2}O_2F$.

* * * * *